United States Patent [19]

Machida et al.

[11] Patent Number: 5,280,546
[45] Date of Patent: Jan. 18, 1994

[54] IMAGE PROCESSING APPARATUS FOR VARIABLY MAGNIFYING IMAGE AND CONTROLLING IMAGE DENSITY

[75] Inventors: Hironobu Machida, Tokyo; Hiroki Kanno, Yokohama; Hitoshi Yoneda, Kawasaki, all of Japan

[73] Assignee: Kabushiki Kaisha Toshiba, Kawasaki, Japan

[21] Appl. No.: 800,424

[22] Filed: Nov. 29, 1991

[30] Foreign Application Priority Data

Nov. 29, 1990 [JP] Japan .................. 2-333046

[51] Int. Cl.⁵ .............................................. G06K 9/36
[52] U.S. Cl. .................................. 382/47; 382/9; 358/455; 358/451
[58] Field of Search .......... 382/9, 47, 49, 50, 53; 358/462, 451, 455, 428, 429

[56] References Cited

U.S. PATENT DOCUMENTS

| | | | |
|---|---|---|---|
| 4,251,837 | 2/1981 | Janeway, III | 382/50 |
| 4,547,811 | 10/1985 | Ochi et al. | 382/9 |
| 4,709,274 | 11/1987 | Tanioka | 358/455 |
| 4,841,462 | 6/1989 | Vigarlé et al. | 364/723 |
| 4,864,413 | 9/1989 | Sasaki | 382/47 |
| 4,924,509 | 5/1990 | Yokomizo | 382/50 |
| 5,054,100 | 10/1991 | Tai | 382/47 |
| 5,161,035 | 11/1992 | Muramatsu | 382/47 |
| 5,170,443 | 12/1992 | Todd | 382/50 |

Primary Examiner—Leo H. Boudreau
Assistant Examiner—Larry J. Prikockis
Attorney, Agent, or Firm—Foley & Lardner

[57] ABSTRACT

An image forming apparatus capable of magnifying a target image to any desired magnification, includes functions for detecting the maximum and minimum densities from limited image information, including a data piece representing a picture element of the target image, functions for determining from the difference between the maximum and minimum densities detected by the detection means, whether the picture element is in a photographic region or a character region, functions for determining a picture element density appropriate for magnifying the target image from the density of the target picture element and that of a picture element close to the target picture element, and functions for outputting the picture element density determined by the density-determining means, in accordance with whether the target picture element is in a photographic region or a character region.

7 Claims, 14 Drawing Sheets

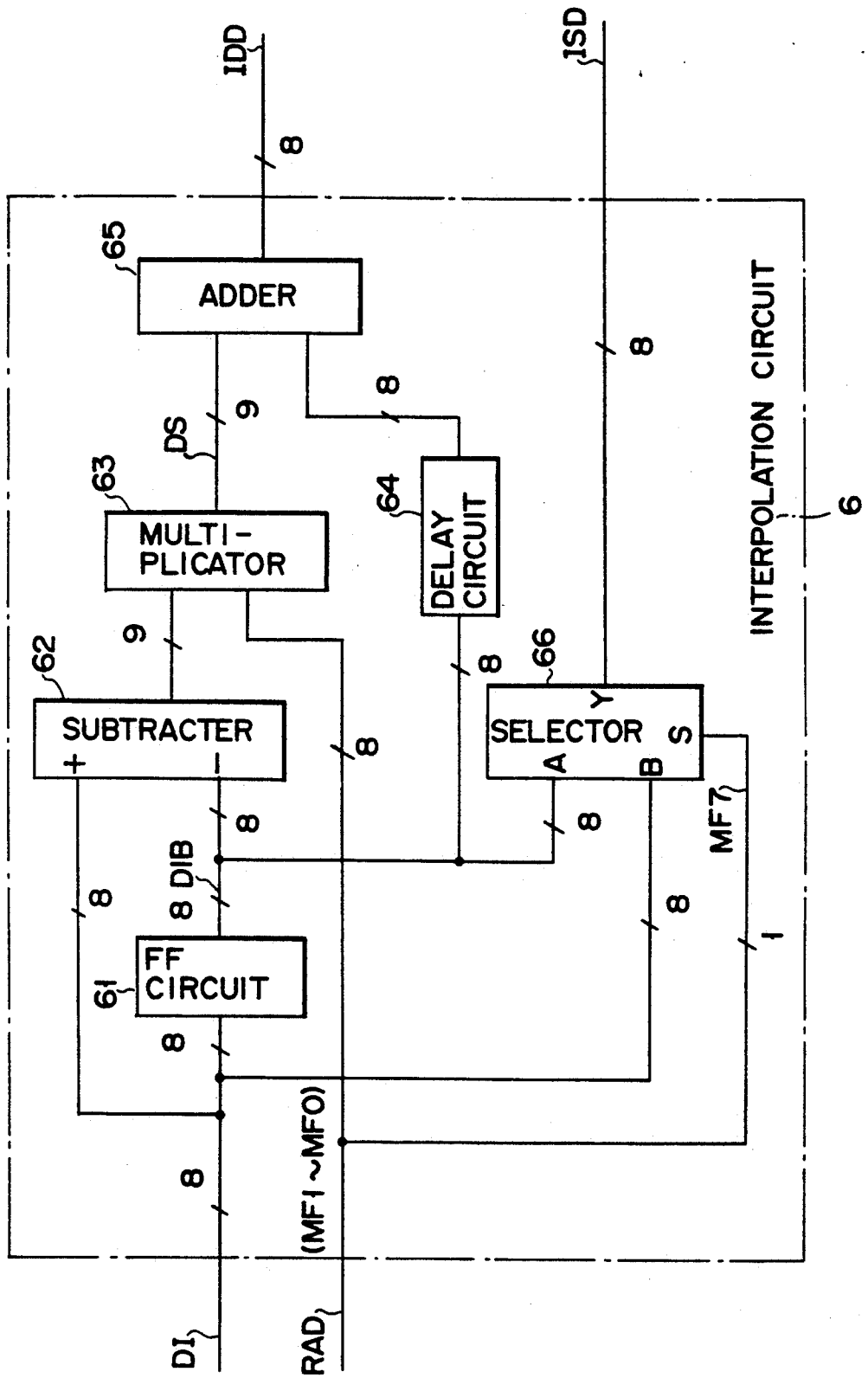
F I G. 5

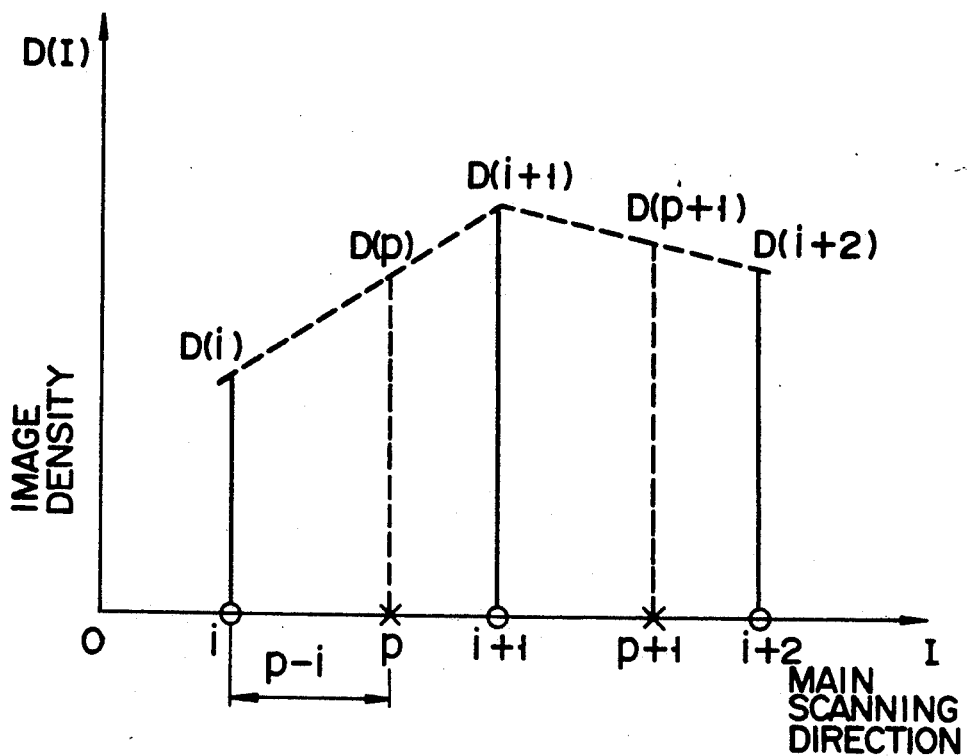
F I G. 6
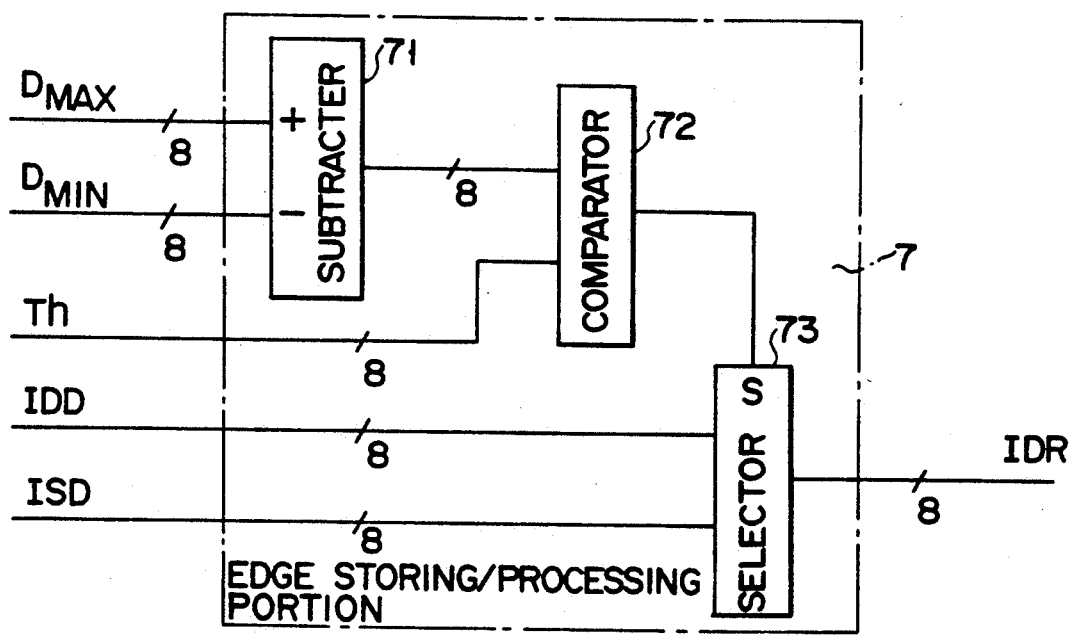
F I G. 7

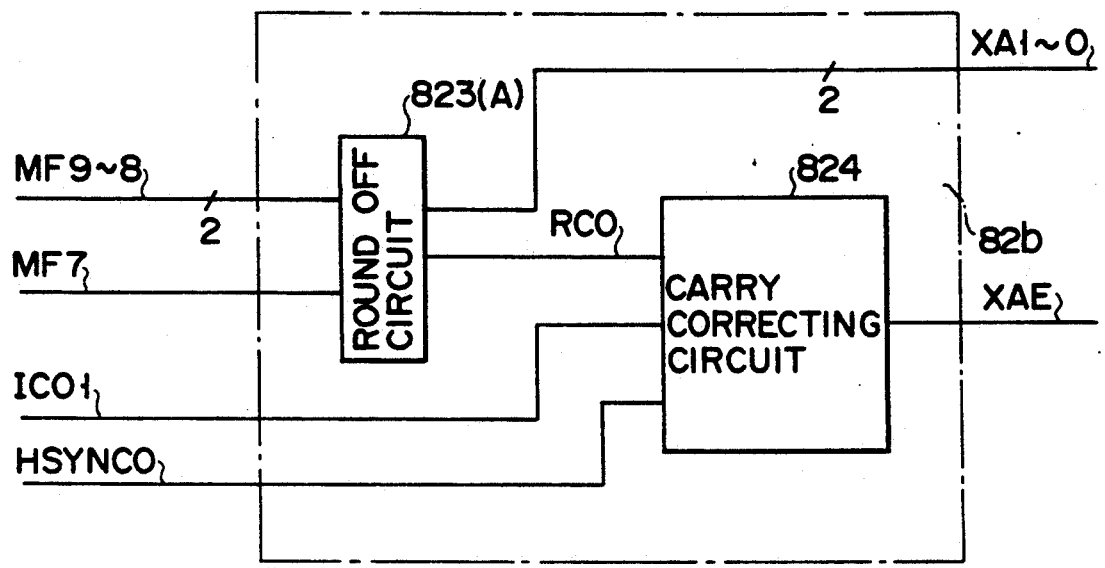
F I G. 11
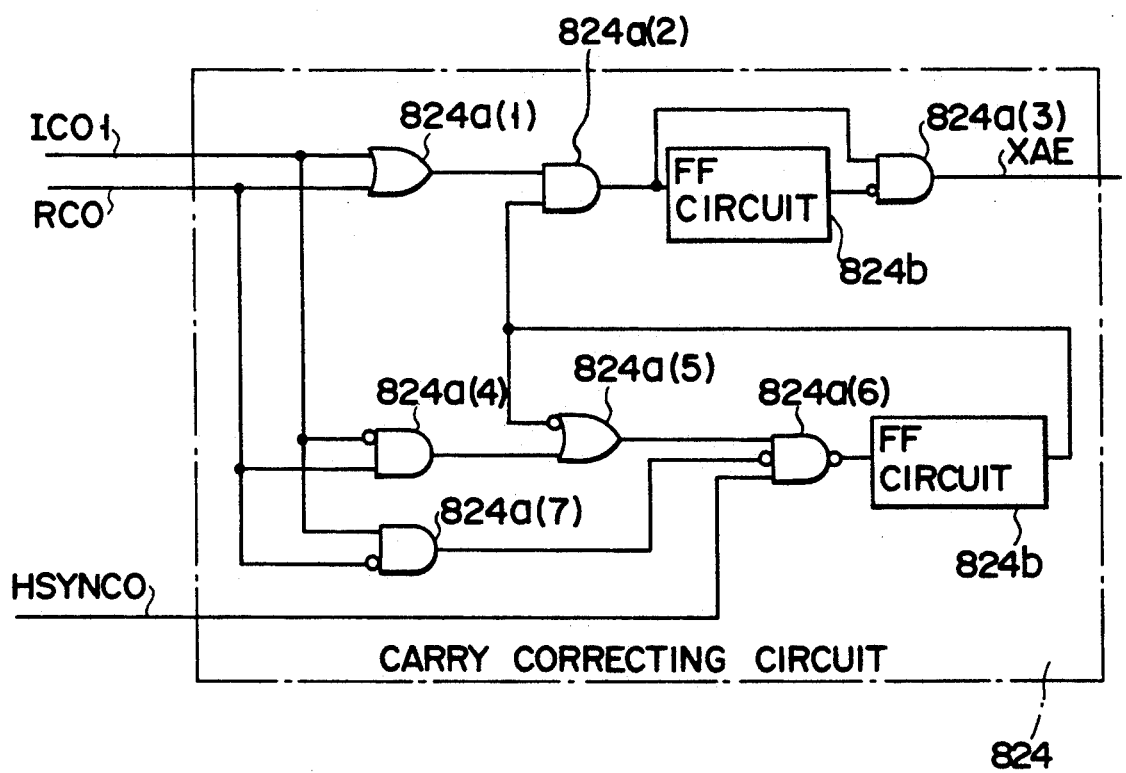
F I G. 12

| S0 | S1 |  | ICD |
|---|---|---|---|
| 0 | 0 | $IDD < Thl$ | $D_{MIN}$ |
| 1 | 0 | $Thl \leq IDD \leq Thh$ | $(D_{MAX} + D_{MIN})/2$ |
| 0 | 1 | — | — |
| 1 | 1 | $IDD \geq Thh$ | $D_{MAX}$ |

$Thl < Thh$

F I G. 14

| S0 |  | ICD |
|---|---|---|
| 0 | $IDD < DM$ | $D_{MIN}$ |
| 1 | $IDD \geq DM$ | $D_{MAX}$ |

$DM = (D_{MAX} + D_{MIN})/2$

F I G. 17

| S1 | S2 |  | IDR |
|---|---|---|---|
| 0 | 0 | $\Delta D_{MAX} < Thl$ | IDD |
| 1 | 0 | $Thl \leq D_{MAX} < Thh$ | ICD |
| 0 | 1 | — | — |
| 1 | 1 | $\Delta D_{MAX} \geq Thh$ | ISD |

$\Delta D_{MAX} = D_{MAX} - D_{MIN}$

F I G. 18

IMAGE PROCESSING APPARATUS FOR VARIABLY MAGNIFYING IMAGE AND CONTROLLING IMAGE DENSITY

BACKGROUND OF THE INVENTION

1. Field of the Invention

The present invention relates to an image processing apparatus which can perform expansion/reduction processing of a document image including both character and photographic images, while ensuring both a good resolution of a character portion and a good gradation of a photographic region.

2. Description of the Related Art

In a document image processing apparatus which can handle image information as well as code information, binary quantization of document information read by a read means, such as a scanner, is generally performed as follows. With respect to an image information having contrast, such as characters and line drawings, simple binary quantization is performed by using a fixed threshold value. With respect to image information having a gradation, such as photographs, binary quantization is performed by a pseudo-gradation representing means, such as the dither method. Such a means is employed for the following reason. If simple binary quantization is performed with respect to read image information by using a fixed threshold value, no deterioration in image quality occurs in character/line drawing image regions because resolution is preserved, but deterioration in image quality occurs in photographic image regions because the gradation is not preserved.

In contrast to this, if gradation processing such as the ordered dither method is performed with respect to read image information, no deterioration in image quality occurs in photographic image region because the gradation property is preserved, but a deterioration in image quality occurs in character/line drawing image regions because the resolution property deteriorates. That is, if a single binary quantization method is performed with respect to the read image information, high image quality cannot be ensured in regions with different features at the same time. For this reason, when a document on which character and photographic images are formed together is to be processed, a target image is separated into a character region and a photographic region, and the character and photographic regions are processed by selectively or adaptively switching between the simple binary quantization mode and the dither processing mode.

When image information is to be output upon expansion or reduction, multi-value image information input through a scanner or the like is expanded/reduced in advance, and the above-described binary quantization is performed. This is because the expansion/reduction processing after binary quantization is inferior to that of the multi-value image information in terms of the precision of expansion/reduction processing. As such expansion/reduction processing, the linear interpolation method, the projection method, and the like are known.

In these methods, however, since the image information of neighboring picture elements is interpolated, changes in density of an image cannot be faithfully reproduced. In the above-described image region separation method, changes in density of an image are used. Therefore, image region separation cannot be performed with respect to an image which has undergone the conventional expansion/reduction processing. That is, a conventional apparatus cannot perform expansion/reduction processing of a document on which character and photographic images are formed together while ensuring both good resolution of a character portion and good gradation of a photographic region.

SUMMARY OF THE INVENTION

It is an object of the present invention to provide an image processing apparatus which can perform expansion/reduction processing of a document having both character and photographic images while excellent image quality is maintained.

According to the present invention, there is provided an image forming apparatus capable of magnifying a target image at any desired magnification, comprising functions for detecting maximum and minimum densities from limited image information, including a data piece representing a picture element of the target image, functions for determining, from the difference between the maximum and minimum densities detected by the detection means, whether the picture element is in a photographic region or a character region, functions for determining a picture element density appropriate for magnifying the target image from the density of the target picture element and that of a picture element close to the target picture element, and functions for outputting the picture element density determined by the density-determining means in accordance with whether the target picture element is in a photographic region or a character region.

According to the present invention, with the abovedescribed arrangement, a proper image density in a variable magnification process of a target image is determined depending on whether the target image is character or photographic information. On the basis of the density difference between the maximum and minimum densities detected by the detecting means, the determining means determines whether an image at a predetermined position corresponds to a character or photographic region. The outputting means then outputs density information in accordance with the determination result. More specifically, if the image corresponds to a photographic region, proper density information decided by the determining means is output. If the image corresponds to a character region, the density of the pixel nearest to the target picture element is output from the outputting means. With this operation, in the image processing apparatus of the present invention, a proper image density can be obtained in accordance with the type of image information, i.e., photographic or character information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram showing the arrangement of an interpolation circuit;

FIG. 6 is a view schematically showing linear interpolation processing;

FIG. 7 is a block diagram showing the arrangement of an edge preservation processing portion;

FIGS. 10 and 11 are block diagrams showing the arrangement of a control signal generator;

FIG. 12 is a block diagram showing the arrangement of a carry correcting circuit;

FIGS. 14, 17 and 18 are views for explaining the conditions for selection performed by selectors in other embodiments.

DETAILED DESCRIPTION OF THE PREFERRED EMBODIMENTS

An embodiment of the present invention will be described below with reference to the accompanying drawings.

Figure 1:
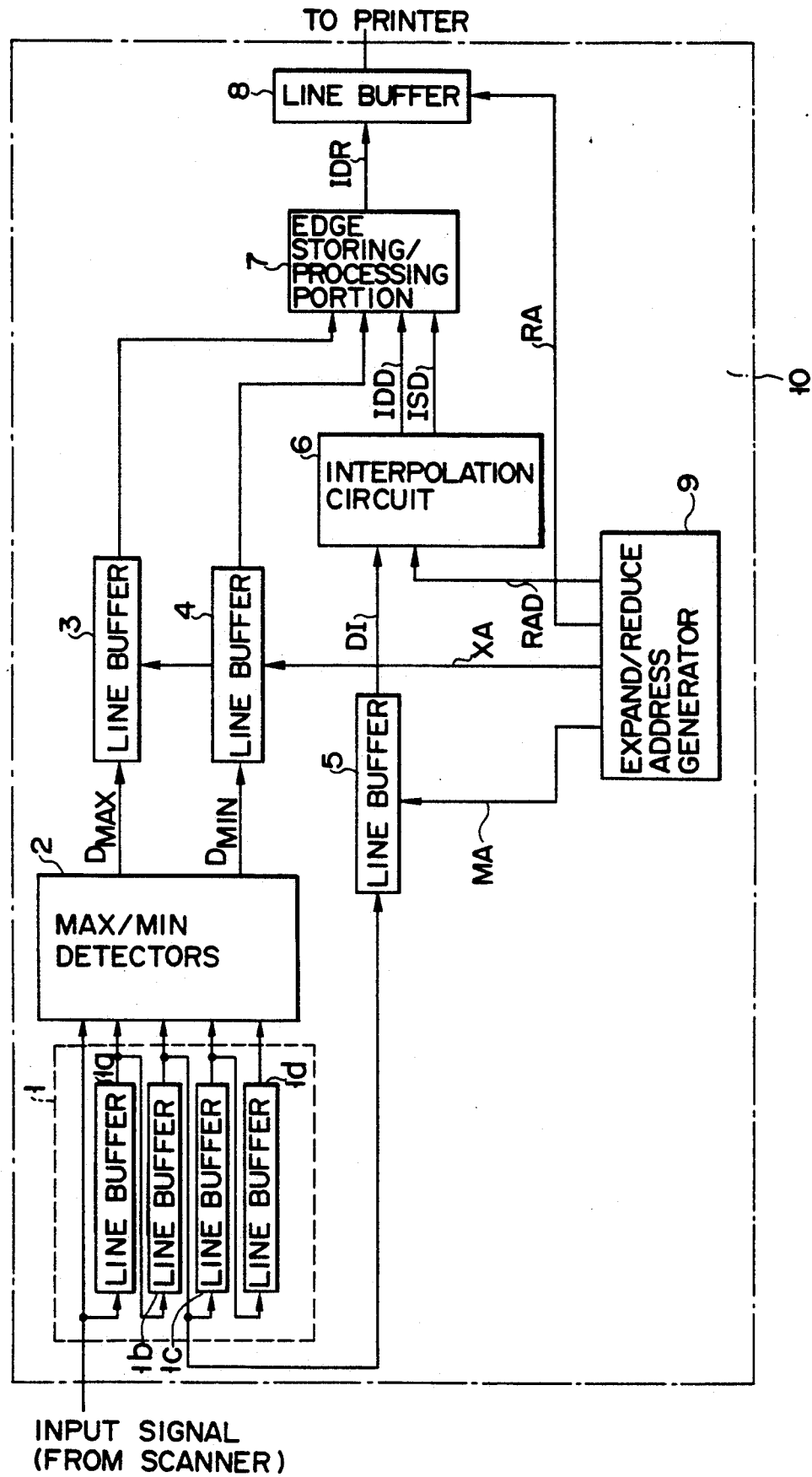
FIG. 1 is a block diagram showing the arrangement of an image processing apparatus.

FIG. 1 is a block diagram showing the schematic arrangement of an image processing apparatus. This image processing apparatus 10 receives image information read by a read unit (not shown), e.g., an image scanner, as digital data, each picture element of which consists of, e.g., 8 bits. The apparatus 10 then performs expansion or reduction processing of the received digital data in accordance with a preset variable magnification, and outputs the resulting image information to an output unit (not shown), e.g., a printer or a personal computer. For example, the image processing apparatus 10 comprises a line buffer portion 1, a max/min detecting portion 2, line buffers 3, 4, 5 and 8, an interpolation circuit 6, an edge preservation processing portion 7, and an expand/reduce address generating portion 9.

Image information supplied from the read unit is input to the line buffer portion 1. The line buffer portion 1 serves to store image information read by the read unit by an amount corresponding to several lines. The line buffer portion 1 is constituted by line buffers corresponding to a plurality of lines, e.g., line buffers 1a to 1d corresponding to four lines. Image information corresponding to five lines is output from the line buffer portion 1 and is supplied to the max/min detecting portion 2.

The max/min detecting portion 2 receives the image information supplied from the line buffer portion 1 in synchronism with a predetermined clock and obtains feature information of maximum density $D_{MAX}$ and minimum density $D_{MIN}$ in a local region including a target picture element from the input image information. The maximum density information $D_{MAX}$ and the minimum density information $D_{MIN}$ output from the max/min detecting portion 2 are respectively supplied to the line buffers 3 and 4 in synchronism with a predetermined clock and are temporarily stored therein.

In addition, one-line image data including a target picture element, which is output from the line buffer 1b of the line buffer portion 1, is output to the line buffer 5 to be temporarily stored.

The interpolation circuit 6 serves to perform interpolation by the linear interpolation method. The interpolation circuit 6 obtains a density IDD at a resampling point and a nearest original picture element density ISD on the basis of a target picture element density DI information from the line buffer 5 and resampling point position information RAD from the expand/reduce address generating portion 9. The circuit 6 then outputs the obtained information to the edge preservation processing portion 7.

The edge preservation processing portion 7 detects an edge portion by performing edge detection (to be described later) using the maximum density information $D_{MAX}$ from the line buffer 3 and the minimum density information $D_{MIN}$ from the line buffer 4. Subsequently, the portion 7 outputs the re-sampling point density information IDD or the nearest original picture element density information ISD from the interpolation circuit 6 as an edge preservation processing result (density at the re-sampling point) IDR.

The line buffer 8 serves to temporarily store the edge preservation processing result (density at the resampling point), from the edge preservation processing portion 7, which is based on the re-sampling point density information IDD or the nearest original picture element density information ISD.

The expand/reduce address generating portion 9 generates an address corresponding to a variable magnification at which expansion/reduction processing is performed. The generated address is output to the line buffers 3, 4, 5, and 8 and the interpolation circuit 6.

Expansion/reduction processing is executed in the following manner.

The expand/reduce address generating portion 9 outputs addresses MA and XA corresponding to a variable magnification (repetitive addresses corresponding to a variable magnification in the expansion mode; sequential addresses in the reduction mode) to the line buffers 3, 4, and 5, and reads out the target picture element density information DI, the maximum density information $D_{MAX}$, and the minimum density information $D_{MIN}$ from the line buffers 5, 3, and 4, respectively. At the same time, the expand/reduce address generating portion 9 outputs the re-sampling point position information RAD, calculated from the variable magnification, to the interpolation circuit 6.

The interpolation circuit 6 obtains the density IDD at the re-sampling point by performing linear interpolation of two original picture elements located before and after the re-sampling point using the target picture element density information DI and the resampling point position information RAD. The edge preservation processing portion 7 detects an edge portion by performing edge detection (to be described later) using the maximum density information $D_{MAX}$ and the minimum density information $D_{MIN}$, and obtains the re-sampling point density information IDR by edge preservation processing (to be described later). The re-sampling point density information IDR obtained by the edge preservation processing is stored in the line buffer 8 at an address RA generated by the expand/reduce address generating portion 9 in accordance with a variable magnification (a sequential address in the expansion mode; a repetitive address corresponding to a variable magnification in the reduction mode).

The image data processed in the above-described manner is sequentially read out from the line buffer 8 to be output to an output unit (not shown) in synchronism with a sync signal from the output unit. The image data is visualized after the output unit performs image processing, e.g., gradation processing, with respect to the image data.

The respective components of the apparatus will be described in detail below.

Figure 2:
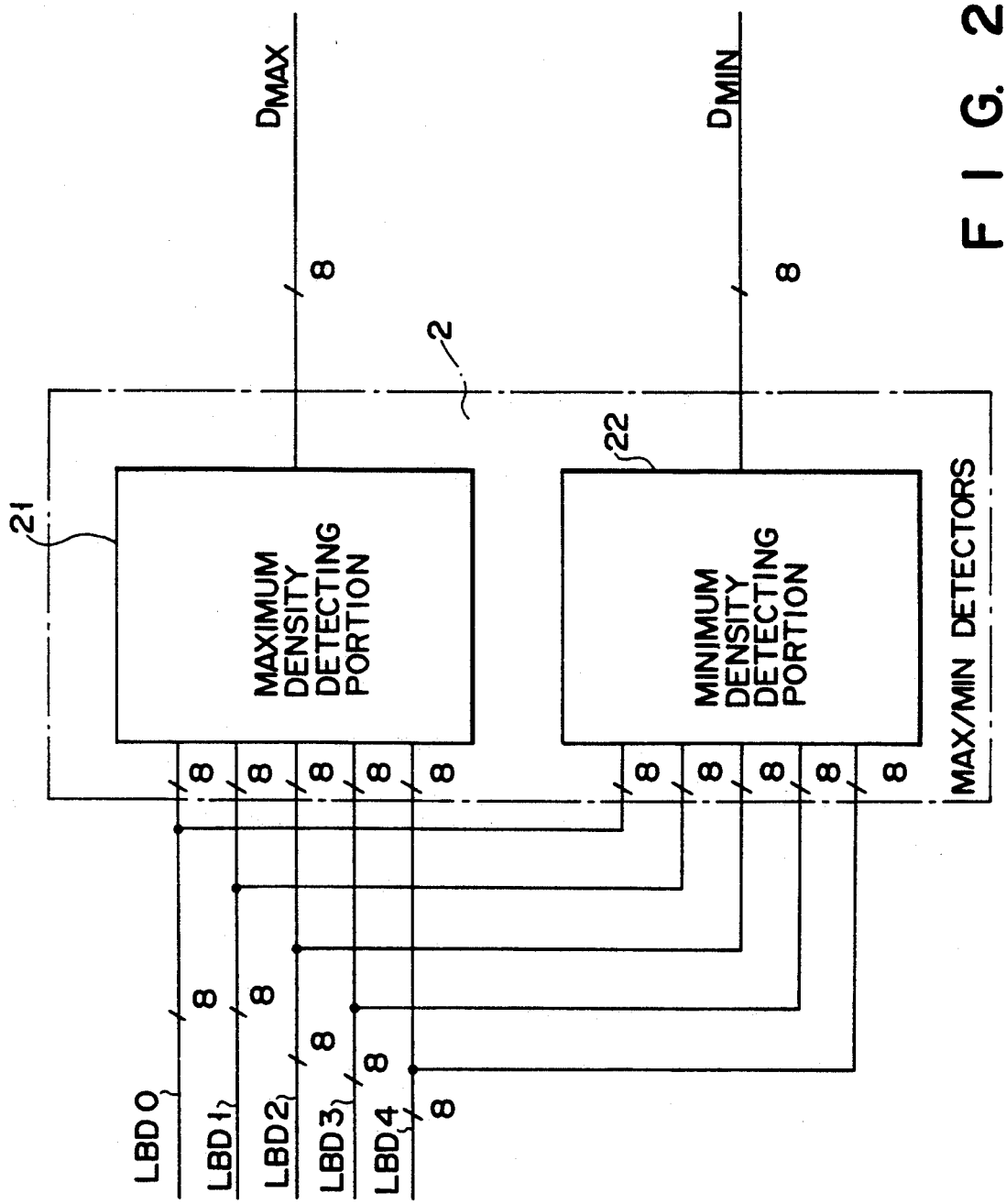
FIG. 2 is a block diagram showing the arrangement of a max/min detecting portion.

The max/min detecting portion 2 is constituted by a maximum density detecting part 21 and a minimum density detecting portion 22, as shown in FIG. 2. Referring to FIG. 2, reference symbol LBD2 denotes image data of a line including a target picture element, which is supplied from the line buffer 1b of the line buffer portion 1; and LBD0, LBD1, LBD3, and LBD4, image data of two pairs of lines located before and after the target picture element line, which are supplied from the read unit and the line buffers 1a, 1c, and 1d of the line buffer portion 1.

Figure 3:
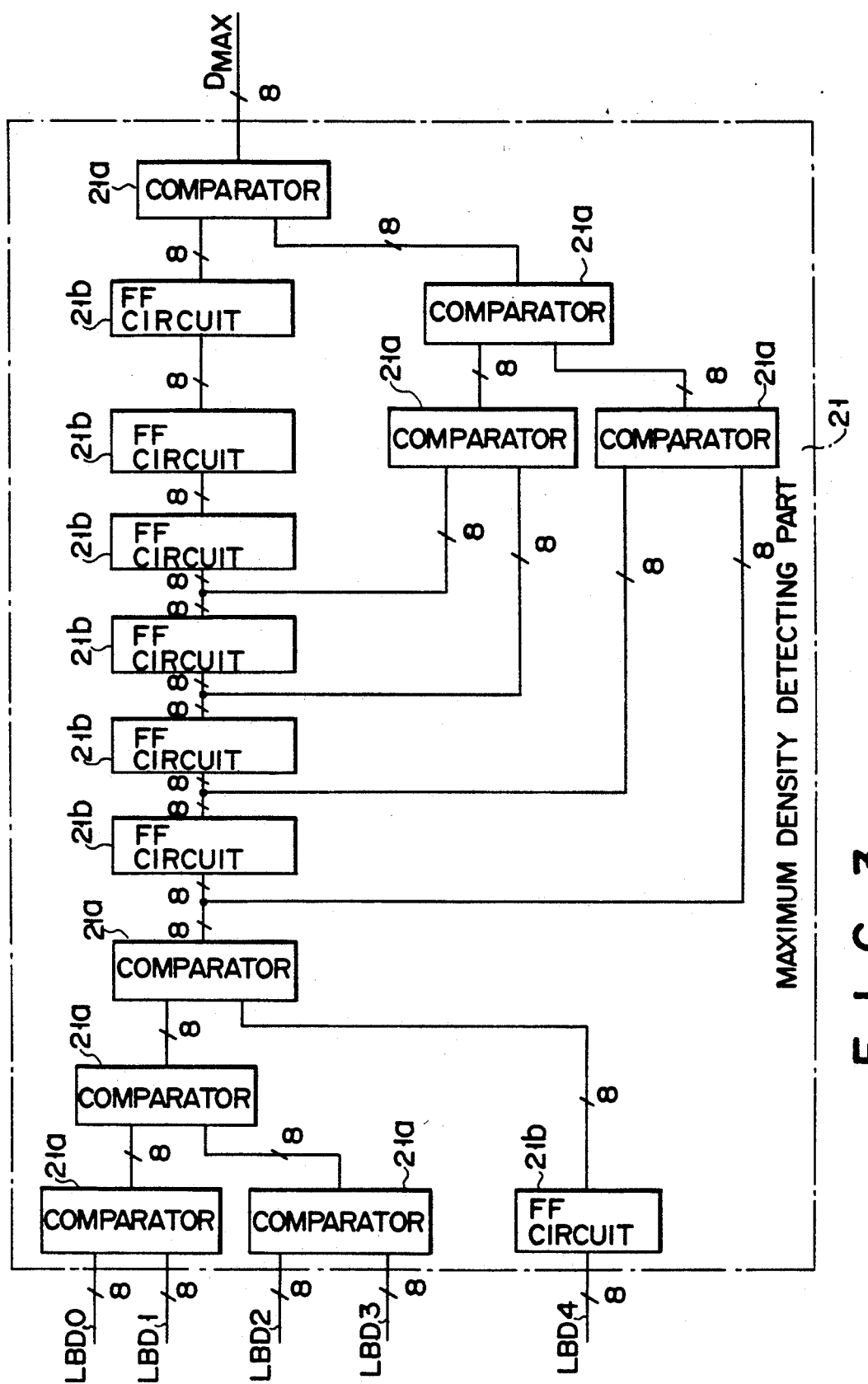
FIG. 3 is a block diagram showing the arrangement of a maximum density detecting portion.
Figure 4:
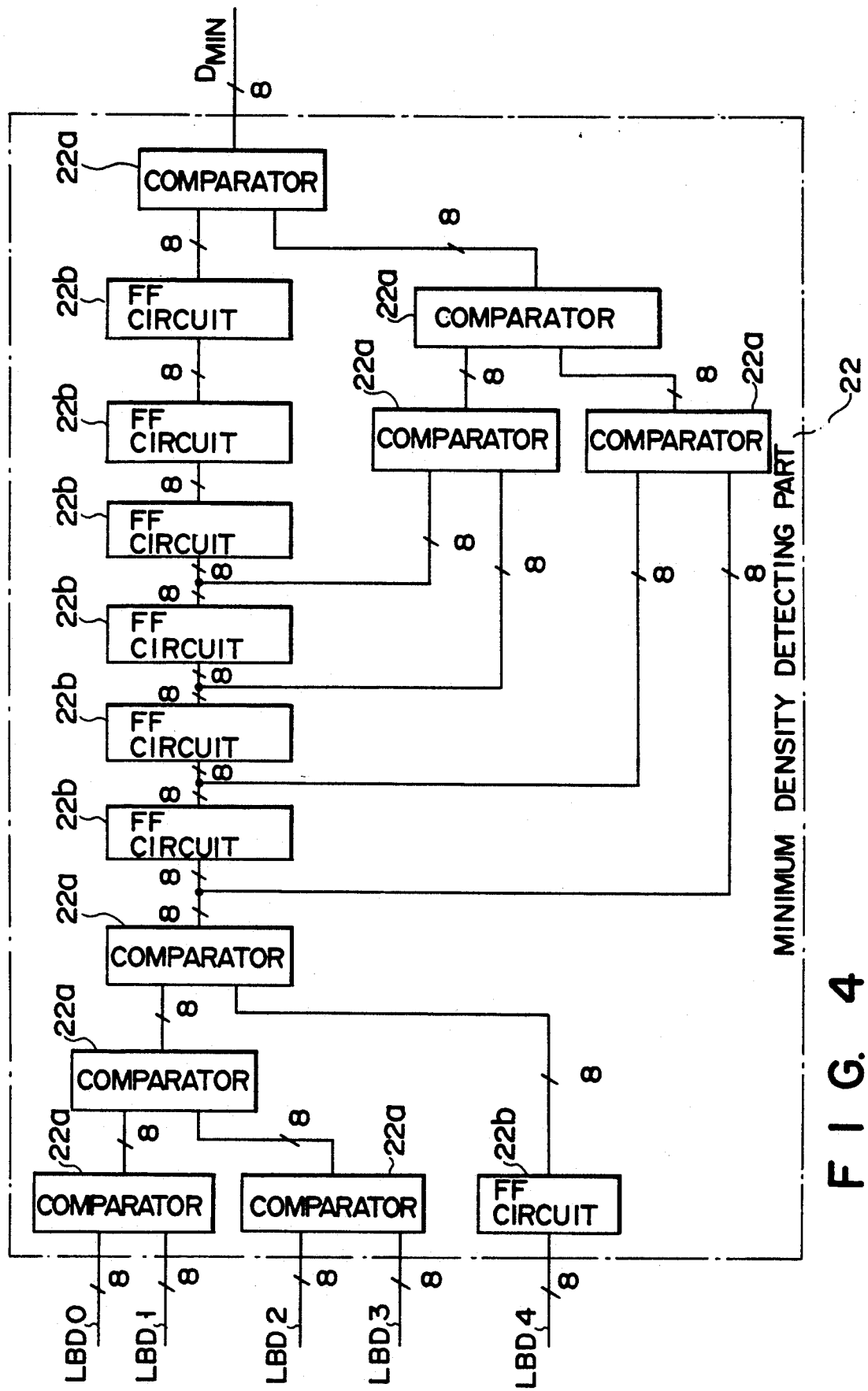
FIG. 4 is a block diagram showing the arrangement of a minimum density detecting portion.

FIGS. 3 and 4 respectively show the maximum density detecting part 21 and the minimum density detector 22 in detail. As shown in FIG. 3, the maximum density detecting part 21 comprises eight comparators 21a and seven FF (flip-flop) circuits 21b. Each comparator 21a receives two types of 8-bit data in synchronism with a predetermined clock to compare them, and outputs data having a larger value at the next clock. Each comparator 21a incorporates one 8-bit FF (flip-flop) circuit (not shown) at its output stage. As shown in FIG. 4, the minimum density detector 22 comprises eight comparators 22a and seven FF (flip-flop) circuits 22b. Each comparator 22a receives two types of 8-bit data in synchronism with a predetermined clock to compare them, and outputs data having a smaller value at the next clock. Each comparator 22a incorporates one FF (flip flop) circuit (not shown) at its output stage.

The maximum density detecting part 21 and the minimum density detector 22 consist of eight pipeline stages each. The detecting portions 21 and 22 respectively detect the maximum density ($D_{MAX}$) and the minimum density ($D_{MIN}$) in a 5×5 matrix having a target picture element located in the center, thus outputting the detected values as the maximum density information $D_{MAX}$ and minimum density information $D_{MIN}$ of the target picture element.

The interpolation circuit 6 comprises an FF circuit 61, a subtracter 62, a multiplier 63, a delay circuit 64, an adder 65, and a selector 66, as shown in FIG. 5. In this case, a generally known linear interpolation method is used as an interpolation processing scheme. This interpolation processing scheme will be described below with reference to FIG. 6. Referring to FIG. 6, the position of an image in the line direction (main scan, direction) is plotted along an abscissa axis I, the "i", "i+1", "i+2", . . . indicate the positions of original images read by the read unit, while "p", "p+1", . . . indicate the positions of re-sampling points corresponding to variable magnifications. The density of an image is plotted along the ordinate axis, and "D(i)", "D(i+1)", "D(i+2)", . . . indicate the densities of the original images, while "D(p)", "D(p+1)", . . . indicate the densities, of the re-sampling points, which are calculated by the interpolation circuit 6. The interpolation circuit 6 calculates the density of the re-sampling point p according to the following equation:

$$D(p) = \{D(i+1) - D(i)\} \times (p-i)/256 + D(i) \quad (1)$$

The reason why "256" is set as the divisor in this equation is that in this embodiment, a value obtained by dividing the distance between the position of an original image and its adjacent re-sampling point by 256 is used as a unit of the position precision of the re-sampling point p. The subtracter 62 serves to calculate $DR = D(i+1) - D(i)$ in equation (1) and is designed to receive 8-bit data and output 9-bit data. Of the 9-bit output, the ninth bit (MSB) is a sign bit. The multiplier 63 calculates $DS = DR \times (p-i)/256$ in equation (1) and uses the Booth algorithm. One input terminal of the multiplier 63 receives 8-bit data consisting of only positive numbers. The value $(p-i)$ is input to this input terminal. The other input terminal of the multiplier 63 receives 9-bit data having a sign bit. The value "DS" is input to this input terminal. The multiplier 63 outputs 9-bit data having a sign bit, which is obtained by omitting the lower 8 bits from the calculation result. The value $(p-i)$ consists of 8 bits and corresponds to the re-sampling point position information RAD supplied from the expand/reduce address generating portion 9. The delay circuit 64 delays an output DIB from the FF circuit 61 by an amount corresponding to a predetermined number of clocks to establish synchronization with the output DS from the multiplier 63. The adder 65 adds the output DS from the multiplier 63 and the output DIB from the FF circuit 61 together, and outputs the re-sampling point density information IDD. The adder 65 receives 9-bit data with a sign and 8-bit data without a sign. The output from the adder 65 is defined as "IDD≧0" and hence consists of 8 bits without a sign. The selector 66 receives the density information of two original picture elements located before and after the re-sampling point, and outputs the nearest original picture element density information ISD corresponding to the re-sampling point from the most significant bit (MF7) of the re-sampling point position information RAD.

The edge preservation processing portion 7 comprises a subtracter 71, a comparator 72, and a selector 73, as shown in FIG. 7. The subtracter 71 calculates a maximum density difference $\Delta D_{MAX}$ between the maximum density information $D_{MAX}$ and the minimum density information $D_{MIN}$ respectively supplied from the line buffers 3 and 4 as follows:

$$\Delta D_{MAX} = D_{MAX} - D_{MIN} \quad (2)$$

The subtracter 71 receives and outputs 8-bit data. The comparator 72 compares the maximum density difference $\Delta D_{MAX}$ with a preset edge determination threshold value Th. If the comparison result is $$\Delta D_{MAX} \geq Th \quad (3)$$

then, the comparator 72 outputs "1". In contrast to this, if the comparison result is $$\Delta D_{MAX} < Th \quad (4)$$

then, the comparator 72 outputs "0". That is, the comparator 72 serves as an edge determining circuit for checking whether a target picture element is an edge portion. If the comparison result satisfies relation (3), the comparator 72 determines that the target picture element is an edge portion. The selector 73 selectively outputs the interpolation processing density IDD or the nearest original picture element density ISD in accordance with the comparison result from the comparator 72. More specifically, if it is determined from the comparison result from the comparator 72 that the re-sampling point does not correspond to an edge portion, the re-sampling point density information IDD obtained by the interpolation circuit 6 is output from the selector 73. In contrast to this, if it is determined that the re-sampling point corresponds to an edge portion, the density information ISD of the original picture element nearest to the re-sampling point is output as the density information IDR of the re-sampling point instead of the re-sampling point density information IDD.

Figure 8:
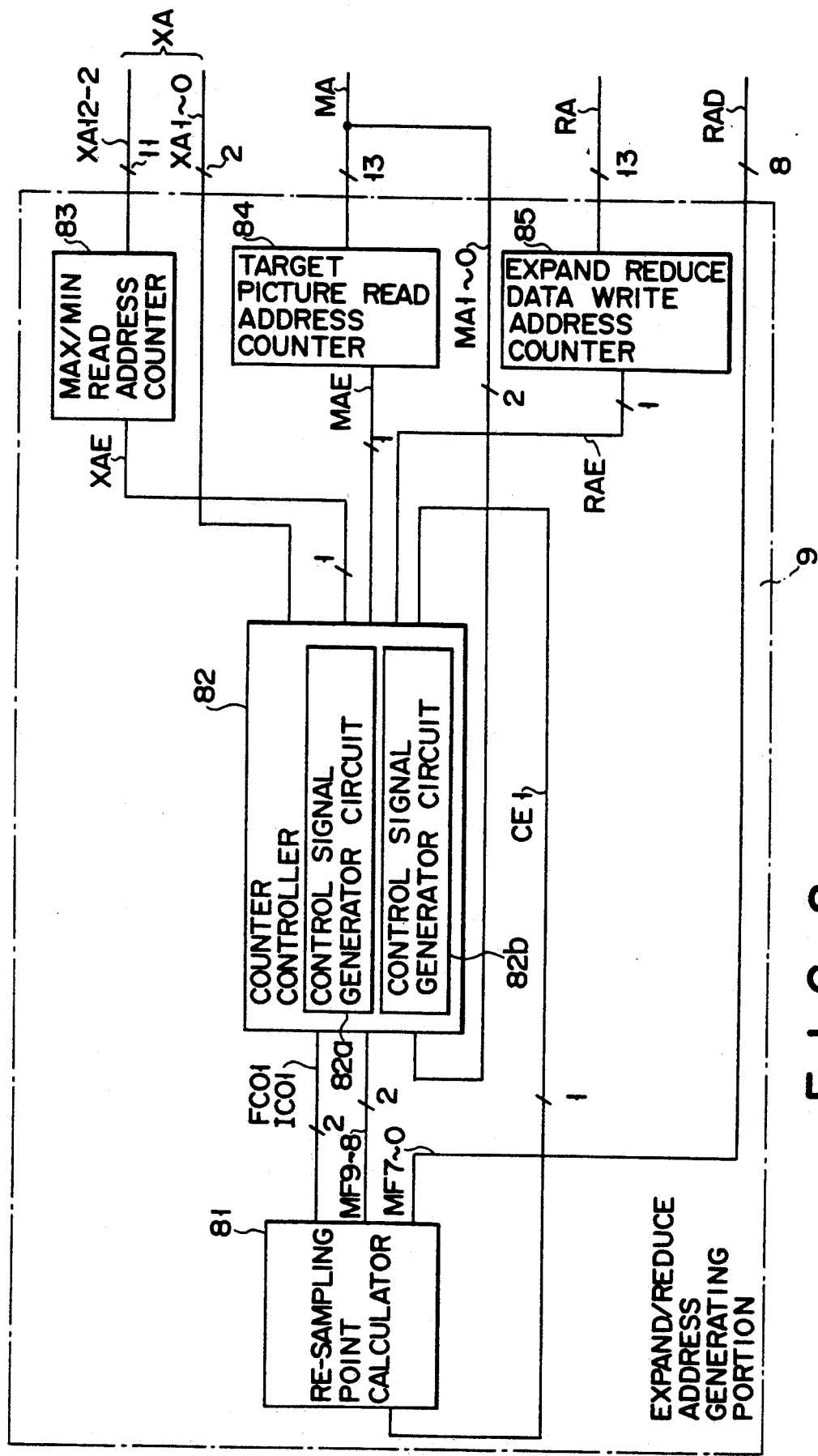
FIG. 8 is a block diagram showing the arrangement of an expand/reduce address generating portion.

As shown in FIG. 8, the expand/reduce address generating portion 9 comprises a re-sampling point calculator 81, a counter controller 82, a max/min read address counter 83, a target picture element read address counter 84, and an expand/reduce data write address counter 85.

The re-sampling point calculator 81 serves to calculate re-sampling point position information. The counter controller 82 controls the three address counters 83, 84, and 85 in accordance with a variable magnification. The max/min read address counter 83 reads out the maximum density information $D_{MAX}$ and the minimum density information $D_{MIN}$ respectively stored in the line buffers 3 and 4. The target picture element read address counter 84 serves to read out target picture element information stored in the line buffer 5. The expand/reduce data write address counter 85 serves to write the re-sampling point density information IDR in the line buffer 8.

The target picture element read address counter 84 and the expand/reduce data write address counter 85 are 13-bit counters with count enable terminals. The max/min read address counter 83 is a 11-bit address counter with a count enable terminal.

Figure 9:
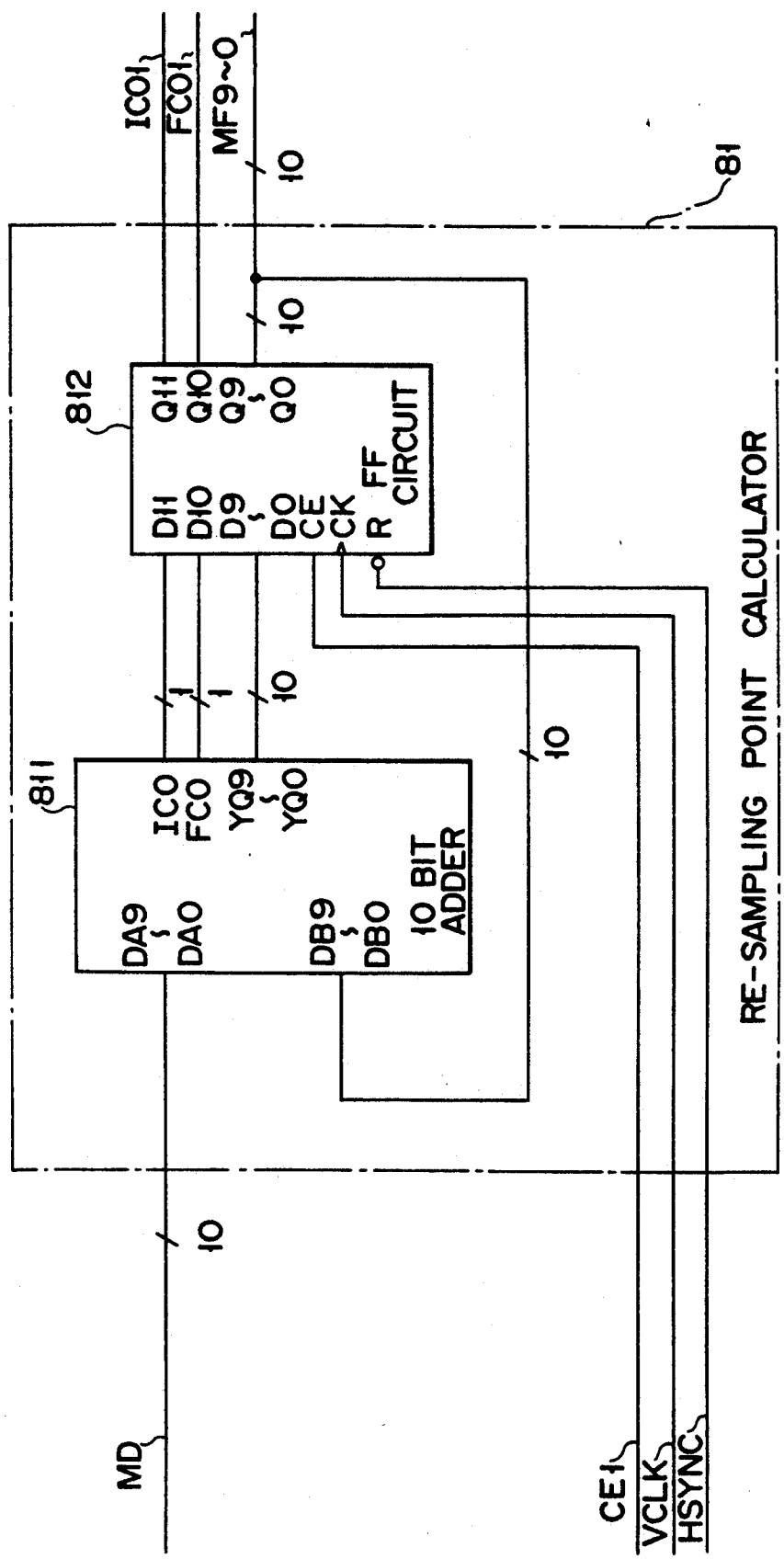
FIG. 9 is a block diagram showing the arrangement of a re-sampling point calculation portion.

The re-sampling point calculator 81 is constituted by a 10-bit adder 811 and an FF circuit 812, as shown in FIG. 9. The FF circuit 812 is a flip-flop with a latch enable (CE) terminal. When the CE terminal is set at "0", an output Q of the circuit 812 does not change. The adder 811 is constituted by an 8-bit half-adder and a 2-bit full adder. A carry-out output from the 8-bit half-adder is output from an output terminal FCO of the adder 811, whereas a carry-out output from the 2-bit full adder is output from an output terminal ICO of the adder 811. The output from the output terminal FCO is supplied to the carry-in input of the 2-bit full adder. A reciprocal value MD of a preset variable magnification m is supplied from an external unit (not shown) to an input terminal DA of the 10-bit adder 811.

The value MD is calculated according to equation (5):

$$MD = 256/m \quad (5)$$

When image processing is started, the re-sampling point calculator 81 accumulates the value MD in synchronism with predetermined clocks and outputs the addition values as MF9 to MF0. In this case, the initial value is "0". The lower 8 bits (MF7 to MF0) of the addition values MF are output, as the re-sampling point position information RAD, to the interpolation circuit 6 to be used for the above-described interpolation processing. The upper 2 bits (MF9 and MF8) of the addition values MF are output, as a count control signal for controlling the expand/reduce data writ address counter 85 in the reduction mode, to the counter controller 82. An output Q11, i.e., an output FCO1, and an output ICO1 from the FF circuit 812 are output to the counter controller 82. The output FCO1 serves as a counter control signal for controlling the target picture element read address counter 84 in the expansion mode, whereas the output ICO1 serves as a count control signal for controlling the max/min read address counter 83 in the expansion/reduction mode. A signal VCLK is a block signal from an oscillator (not shown). A signal HSYNC is a main scan sync signal from the read unit.

Figure 10:
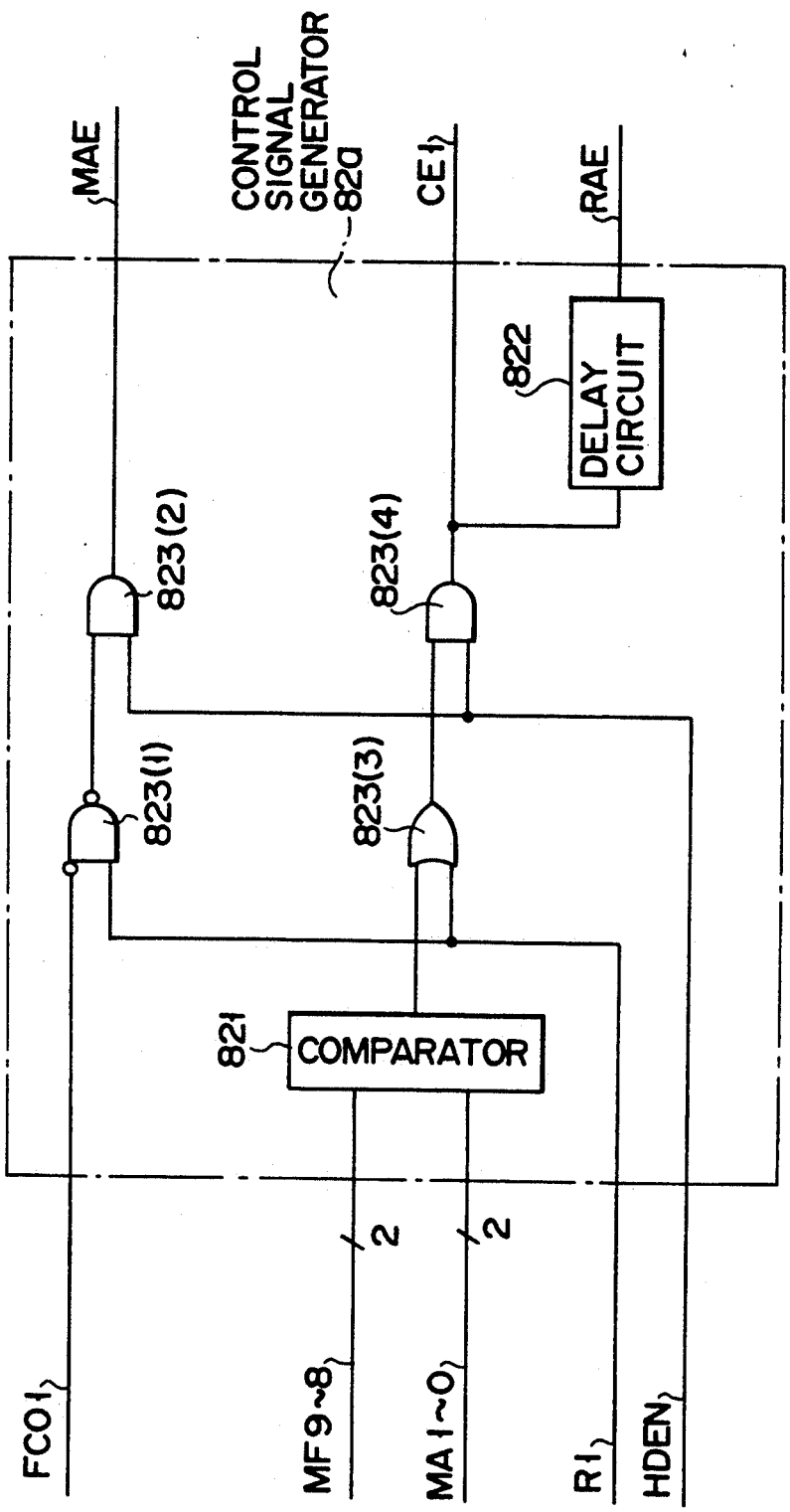

FIG. 10 shows the arrangement of a control signal generator 82a in the counter controller 82. The generator 82a comprises a comparator 821, a delay circuit 822, and four gate circuits 823(1)-(4). The control signal generator 82a is designed to generate control signals MAE and RAE respectively supplied to the target picture element read address counter 84 and the expand/reduce data write address counter 85. A signal R1 is set at "1" in the expansion mode (MD≦256) and is set at "0" in the reduction mode (MD>256). The control signal MAE is used to output the carry-out output FCO1 from the FF circuit 812 of the re-sampling point calculator 81 in the expansion mode and to output a main scan image transfer enable signal HDEN in the reduction mode. The main scan image transfer enable signal HDEN is kept at "1" during an image transfer operation.

With this operation, the target picture element read address counter 84 is incremented only when the carry-out output FCO1 from the FF circuit 812 of the re-sampling point calculator 81 is output in the expansion mode. During an image transfer operation in the reduction mode, the counter 84 is sequentially decremented in synchronism with predetermined clocks. As the control signal RAE, the main scan image transfer enable signal HDEN is output in the expansion mode. In the reduction mode, the comparison result obtained by comparing the upper 2 bits (MF9 and MF8) of an output from the adder 811 of the re-sampling point calculator 81 with the lower 2 bits (MA1 and MA0) of an output from the target picture element read address counter 84 is output as the control signal RAE. If the bits MF9 and MF8 are equal to the bits MA1 and MA0, the comparator 821 outputs "1". The delay circuit 822 performs time adjustment to store the re-sampling point density information IDR, which has undergone the above-described interpolation processing and edge preservation processing, at a predetermined address in the line buffer 8. A signal CE1 is equivalent to the control signal RAE and is output to the CE terminal of the FF circuit 812 in the re-sampling point calculator 81.

In the expansion mode, therefore, the value MD is sequentially added to the outputs MF9 to MF0 from the re-sampling point calculator 81 in synchronism with predetermined clocks during an image transfer operation. In the reduction mode, however, addition of the value MD is stopped until MF1 and MF0 coincide with MA1 and MA0.

Similarly, in the expansion mode, the expand/reduce data write address counter 85 is sequentially incremented in synchronism with predetermined clocks during an image transfer operation. In the reduction mode, the counter 85 is decremented only when the outputs MF1 and MF0 from the re-sampling point calculator 81 coincide with the outputs MA1 and MA0.

FIG. 11 shows the arrangement of a control signal generating circuit 82b in the counter controller 82. The circuit 82b is constituted by a round off circuit 823(A), and a carry correcting circuit 824. The round off circuit 823 serves to add the upper 2 bits (MF9 and MF8) of an output from the re-sampling point calculator 81 to the 8th bit (MF7). An output (XA1 and XA0) from the round off circuit 823 represents the lower 2 bits of the position information of an original picture element nearest to the re-sampling point picture element. The carry correcting circuit 824 generates a control signal XAE for the max/min read address counter 83 by using a carry-out output RCO from the round off circuit 823 and the carry-out output ICO1 from the adder 811 of the re-sampling point calculator 81.

The carry correcting circuit 824 comprises gate circuits 824a(1)-(4) and two FF circuits 824b, as shown in FIG. 12. The carry correcting circuit 824 is constituted by a sequential circuit for generating a pulse having a width of one clock when the carry-out output ICO1 or the carry-out output RCO is at "1", and neglecting the "1" state of the carry-out output ICO1 subsequent to the "1" state of the carry-out output RCO. A signal HSYNCO is an active low main scan sync signal supplied from a printer as an output unit. When the control signal XAE is set at "1", the max/min read address counter 83 is incremented. The line buffers 3 and 4 respectively serving as maximum and minimum density buffers are accessed by outputs (XA12 to XA2) from the max/min read address counter 83 and a 2-bit output (XA1 and XA0) from the round off circuit 823.

As described above, the maximum density difference in a window within a predetermined range including a target picture element is large in a character region but is small in a photographic region. The present invention utilizes this characteristic feature. The maximum density difference between picture elements in a predetermined range is calculated first, and it is checked on the basis of the calculated value whether a target picture element is in a character region or a photographic region. In the expansion/reduction mode, if the target picture element is in a photographic region, expansion/reduction processing is performed by the linear interpolation method or the like, but if the target picture element is in a character region, expansion/reduction processing is performed by the nearest picture element (SPC) method without interpolation. As a result, even a document image including both character and photographic portions can be image-processed to perform proper expansion/reduction processing of the character and photographic portions, and binary quantization can be adaptively performed. That is, binary quantization can be performed while excellent resolution property and excellent gradation property are respectively ensured in the character portion and the photographic portion.

In expansion processing based on interpolation, therefore, the problem that the edge portions of characters and the like are blurred can be solved in the following manner. An edge portion is detected first from the maximum density difference in a local region. The density of a picture element in the edge portion, which is obtained by interpolation is replaced with the density of the nearest original picture element to remove an intermediate density in the edge portion produced by the interpolation, thereby preventing the edge portions of characters from blurring.

The present invention is not limited to the above-described embodiment. For example, the maximum/minimum detection range is not limited to a 5×5 region but can be variably set in accordance with an image to be processed.

In addition, in the above embodiment, the maximum density difference within a predetermined range is used as feature information for edge preservation processing. However, other feature information can be used. Furthermore, in the above embodiment, the value of feature information and a determination threshold value are calculated on the basis of an image signal read by a read means, i.e., a quantity corresponding to the reflectivity of image information. However, identification of an edge portion may be performed on the basis of a value obtained by converting the above-mentioned quantity into an image density (the logarithm of the reciprocal of the reflectivity), and a conversion signal obtained in consideration of the visual characteristics.

Moreover, in the above-described embodiment in the expansion/reduction mode, if a target picture element is in a photographic region, expansion/reduction processing is performed by the linear interpolation method or the like, and if a target picture element is in a character region, expansion/reduction processing is performed by the nearest picture element (SPC) method without interpolation. However, the present invention is not limited to this. For example, expansion/reduction processing may be performed as follows. If a target picture element is in a photographic region, expansion/reduction processing is performed by the linear interpolation method or the like. If, however, a target picture element is in a character region, a linear interpolation image density is compared with the first and second threshold values. If the linear interpolation density is higher than the first threshold value, the maximum value of image information within a predetermined range is output. If the linear interpolation image density is lower than the second threshold value, the minimum value of image information within the predetermined range is output. Otherwise, if the linear interpolation image density is between the first and second threshold values, the mean value of the maximum and minimum values is output.

Figure 13:
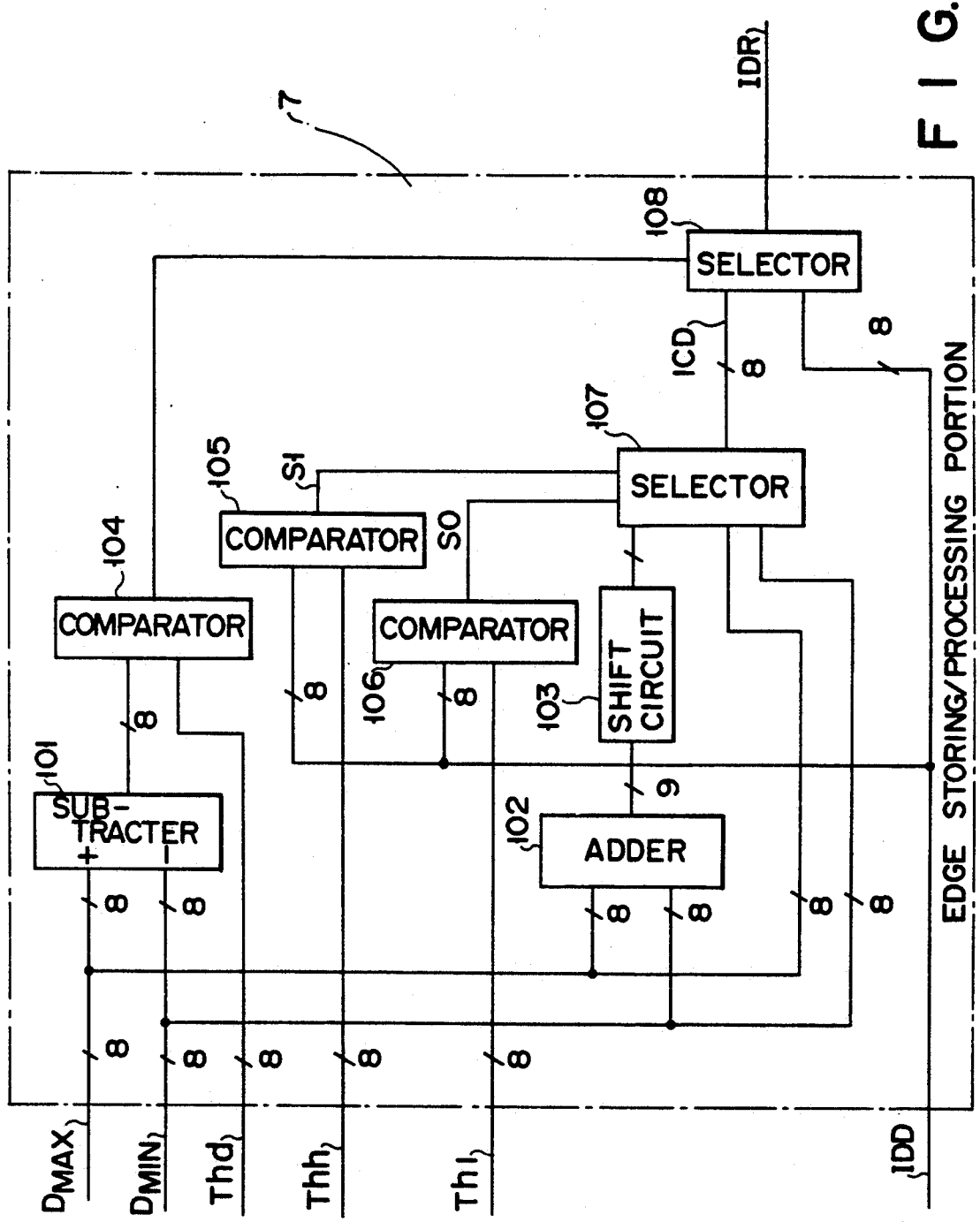
FIG. 13 is a block diagram showing another embodiment of the edge preservation processing portion.

In this case, an edge preservation processing portion 7 is constituted by a subtracter 101, an adder 102, a shift circuit 103, comparators 104, 105, and 106, and selectors 107 and 108, as shown in FIG. 13. The subtracter 101 calculates a maximum density difference $\Delta D_{MAX}$ between maximum density information $D_{MAX}$ and minimum density information $D_{MIN}$ respectively supplied from line buffers 3 and 4 according to the following equation:

$$\Delta D_{MAX} = D_{MAX} - D_{MIN} \tag{6}$$

The subtracter 101 is designed to receive and output 8-bit data. The comparator 104 compares the maximum density difference $\Delta D_{MAX}$ with a preset edge determination threshold value Thd. If the comparison result is $$\Delta D_{MAX} \geq \text{Thd} \tag{7}$$

then, the comparator 104 outputs "1". In contrast to this, if the comparison result is $$\Delta D_{MAX} < \text{Thd} \tag{8}$$

then, the comparator 104 outputs "0". That is, the comparator 104 is an edge determining circuit for checking whether a target picture element is an edge portion. If the comparison result satisfies relation (7), the comparator 104 determines that the target picture element is an edge portion. The adder 102 adds the maximum density information $D_{MAX}$ and the minimum density information $D_{MIN}$ together. The adder 102 is a comparator designed to receive 8-bit data and output 1-bit data. The shift circuit 103 outputs a value DM obtained by shifting the addition result, supplied from the adder 102, to the lower bit (LSB) side by one bit. In this case, the value DM can be represented by $$DM = (D_{MAX} + D_{MIN})/2 \quad (9)$$

That is, the value DM indicates the mean of the maximum density $D_{MAX}$ and the minimum density $D_{MIN}$. The comparator 105 has the same circuit arrangement as that of the comparator 104. The comparator 105 compares a preset value Thh with re-sampling point density information IDD output from an interpolation circuit 6. If the comparison result is $$IDD \geq Thh \quad (10)$$

then, the comparator 105 outputs "1". In contrast to this, if the comparison result is $$IDD < Thh \quad (11)$$

then, the comparator 105 outputs "0". The comparator 106 has the same circuit arrangement as that of the comparator 104. The comparator 106 compares a preset value Th1 (Thh>Th1) with the re-sampling point density information IDD output from the interpolation circuit 6. If the comparison result is $$IDD \geq Th1 \quad (12)$$

then, the comparator 106 outputs "1". In contrast to this, if the comparison result is $$IDD < Th1 \quad (13)$$

then, the comparator 106 outputs "0". The selector 107 selects the maximum density $D_{MAX}$, the minimum density $D_{MIN}$, or the value DM in accordance with comparison results S1 and S2 respectively supplied from the comparators 105 and 106. An output ICD from the selector 107 corresponds to an output from the edge determining circuit, which is output when it is determined that a target picture element is an edge portion. The output IDC is selected as shown in FIG. 14. The selector 108 serves to select the output ICD from the selector 107 or the re-sampling point density information IDD output from the interpolation circuit 6 in accordance with a comparison result from the comparator 104. More specifically, if it is determined on the basis of the comparison result from the comparator 104 that a re-sampling point p is not an edge portion, the selector 107 outputs the density information of the re-sampling point p. In contrast to this, if it is determined that the re-sampling point p is an edge portion, the maximum density information $D_{MAX}$, the minimum density information $D_{MIN}$, or the value DM is output instead of the re-sampling point density information IDD, as shown in FIG. 14. Alternatively, density information may be output in place of the density information IDD in the following manner. The average value of the maximum and minimum values of image information within a predetermined range is compared first with a linearly interpolated image. If the average value is larger than the interpolated image, the maximum value of the image information within the predetermined range is output. Otherwise, the minimum value is output.

Figure 15:
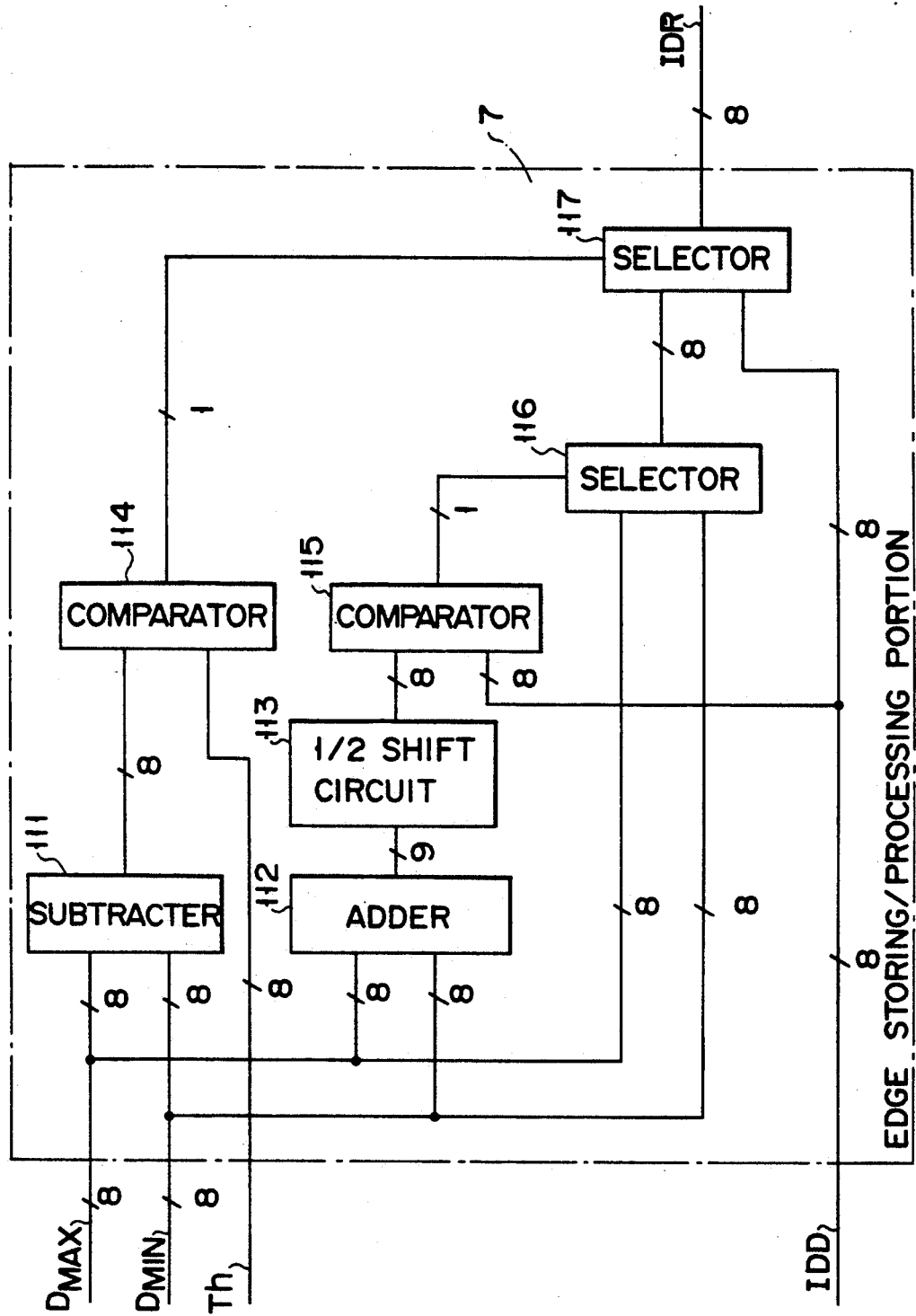
FIGS. 15 and 16 are block diagrams showing other embodiments of the edge preservation processing portion.

In this case, as shown in FIG. 15, an edge preservation processing portion 7 comprises a subtracter 111, an adder 112, a shift circuit 113, comparators 114 and 115, and selectors 116 and 117. Note that since the subtracter 111, the adder 112, the shift circuit 113, and the comparator 114 have the same arrangements as those of the subtracter 101, the adder 102, the shift circuit 103, and the comparator 104 in FIG. 13, a description thereof will be omitted. The comparator 115 compares a value DM obtained by the shift circuit 113 with re-sampling point density information IDD output from an interpolation circuit 6. If the comparison result is $$IDD \geq DM \quad (14)$$

then, the comparator 115 outputs "1". In contrast to this, if the comparison result is $$IDD < DM \quad (15)$$

then, the comparator 115 outputs "0". The selector 116 selects maximum density information $D_{MAX}$ or minimum density information $D_{MIN}$ in accordance with a comparison result from the comparator 115. If the comparison result from the comparator 115 satisfies relation (14), the selector 116 outputs the maximum density information $D_{MAX}$. In contrast to this, if the comparison result from the comparator 115 satisfies inequality (15), the selector 116 outputs the minimum density information $D_{MIN}$. The circuit arrangement of the selector 117 is exactly the same as that of the selector 116. The selector 117 is designed to select the maximum density information $D_{MAX}$ or the minimum density information $D_{MIN}$ from the selector 116, or the re-sampling point density information IDD output from the interpolation circuit 6 in accordance with a comparison result from the comparator 114. More specifically, if it is determined on the basis of the comparison result from the comparator 114 that a re-sampling point p is not an edge portion, the selector 117 outputs the density information of the resampling point p. In contrast to this, if it is determined that the re-sampling point p is an edge portion, the selector 117 outputs either the maximum density information $D_{MAX}$ or the minimum density information $D_{MIN}$, which is closer to the value of the density information IDD, as the density information of the re-sampling point p, in place of the re-sampling point density information IDD.

In this case, the selector 66 in the interpolation circuit 6 is not required.

According to the embodiment having such an arrangement in expansion processing based on interpolation, the problem that the edge portions of characters and the like are blurred can be solved in the following manner. An edge portion is detected first from the maximum density difference in a local region. The density of a picture element in the edge portion, which is obtained by interpolation is replaced with the maximum or minimum density in the local region to remove an intermediate density, in the edge portion, produced by the interpolation, thus obtaining sharp edge portions.

In addition, the edge determination threshold value in the above embodiment may be changed in accordance with a variable magnification. In this case, an edge determination threshold value Th, a variable magnification m, and an optimal edge determination threshold value The are set to have the following relationship:

$$Th = THe/m$$

As a result, in an apparatus for performing expansion/reduction processing by performing digital processing in the main scan direction and analog processing in the sub-scan processing, such as a digital computer even if a density change occurs in the sub-scan direction in accordance with a variable magnification, the identification precision independent of a variable magnification can be ensured by changing the threshold value for image determination in accordance with the variable magnification, thus maintaining the identification precision in image region separation constant.

Furthermore, in the above embodiment, the image reference range in calculation of feature amounts (the detection range of the max/min detecting portion) may be changed in accordance with a variable magnification. More specifically, in the sub-scan direction, if the reference range is constant, the maximum density difference in an image expanded/reduced in an analog manner is decreased in the expansion mode, but is increased in the reduction mode. For this reason, if the reference range is increased in the expansion mode and is decreased in the reduction mode, the maximum density difference is kept constant regardless of a variable magnification. As a result, the identification precision is kept constant regardless of a variable magnification.

Moreover, expansion/reduction processing may be performed in the following manner. If a target picture element is in a photographic region, expansion/reduction processing is performed by the linear interpolation method or the like. If a target picture element is in a character region, the region is divided into two regions. In a region having especially a large maximum density difference, expansion/reduction processing is performed by the nearest picture element (SPC) method without interpolation. In the remaining region, the mean value of the maximum and minimum values of image information in a predetermined range is compared with a linearly interpolated image. If the mean value is larger than the interpolated image, the maximum value of the image information in the predetermined range is output. Otherwise, the minimum value is output.

Figure 16:
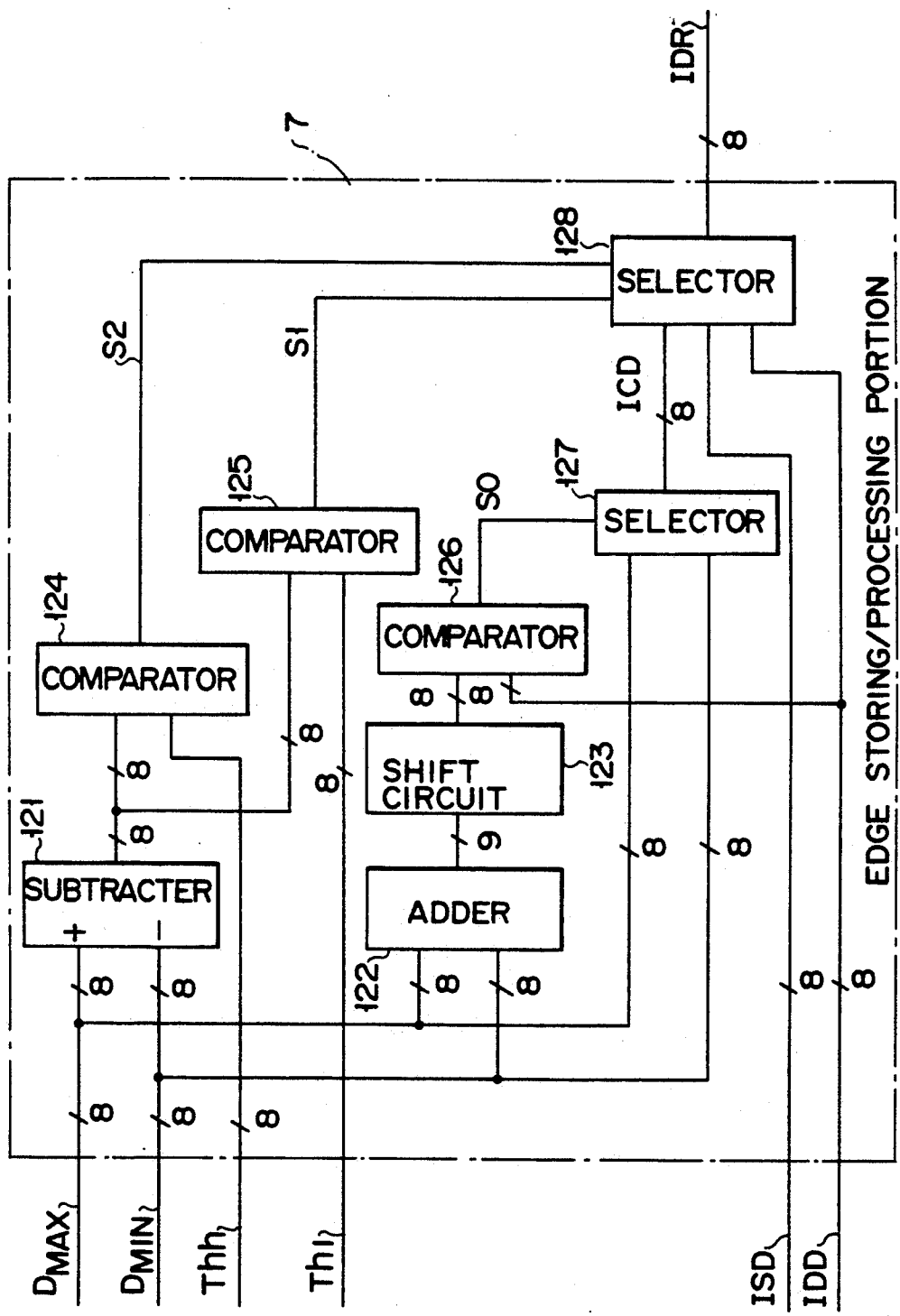

In this case, as shown in FIG. 16, an edge preservation processing portion 7 is constituted by a subtracter 121, an adder 122, a shift circuit 123, comparators 124, 125, and 126, and selectors 127 and 128.

The subtracter 121 calculates a maximum density difference $\Delta D_{MAX}$ between maximum density information $D_{MAX}$ and minimum density information $D_{MIN}$ respectively supplied from line buffers 3 and 4 according to the following equation:

$$\Delta D_{MAX} = D_{MAX} - D_{MIN} \tag{16}$$

The subtracter 121 is designed to receive and output 8-bit data. The comparators 124 and 125 compare the maximum density information $D_{MAX}$ with preset edge determination threshold values (Thh, Th1: Thh > Th1). If the comparison result is $$\Delta D_{MAX} \geq Thh \tag{17}$$

then, both the comparators 124 and 125 output "1". If the comparison result is $$Th1 \leq \Delta D_{MAX} < Thh \tag{18}$$

then, the comparators 124 and 125 respectively output "0" and "1". If the comparison result is $$\Delta D_{MAX} < Th1 \tag{19}$$

then, both the comparators 124 and 125 output "0". The comparators 124 and 125 are designed to receive 8-bit data and output 1-bit data. The adder 122 adds the maximum density information $D_{MAX}$ and minimum density information $D_{MIN}$ together. The adder 122 is designed to receive 8-bit data and output 9-bit data. The shift circuit 123 outputs a value DM obtained by shifting the addition result, supplied from the adder 122, to the lower bit (LSB) side by one bit. In this case, the value DM can be represented by $$DM = (D_{MAX} + D_{MIN})/2 \tag{20}$$

That is, the value DM is the mean between the maximum density information $D_{MAX}$ and minimum density information $D_{MIN}$. The comparator 126 has the same circuit arrangement as the comparator 124 and serves to compare the value DM with re-sampling point density information IDD output from an interpolation circuit 6. If the comparison result is $$IDD \geq DM \tag{21}$$

then, the comparator 126 outputs "1". In contrast to this, if the comparison result is $$IDD < DM \tag{22}$$

then, the comparator 126 outputs "0".

The selector 127 selects the maximum density information $D_{MAX}$ or the minimum density information $D_{MIN}$ in accordance with a comparison result from the comparator 126. As shown in FIG. 17, if the comparison result from the comparator 126 satisfies relation (21), the selector 127 outputs the maximum density information $D_{MAX}$ as an output ICD. In contrast to this, if the comparison result from the comparator 126 satisfies inequality (22), the selector 127 outputs the minimum density information $D_{MIN}$ as the output ICD. The selector 128 selects the maximum density information $D_{MAX}$ or the minimum density information $D_{MIN}$ from the selector 127, or the re-sampling point density information IDD or nearest original picture element density information ISD output from the interpolation circuit 6, in accordance with comparison results from the comparators 124 and 125. That is, as shown in FIG. 18, the selector 128 outputs the re-sampling point density information IDD output from the interpolation circuit 6 if comparison results from the comparators 124 and 125 satisfy inequality (19). If the comparison results satisfy equation (20), the selector 128 outputs the output ICD selected by the conditions shown in FIG. 17. If the comparison result satisfy relation (21), the selector 128 outputs the density information ISD of an original picture element nearest to the re-sampling point as the density of the re-sampling point, in place of the re-sampling point density information IDD.

According to the embodiment having such an arrangement, in expansion processing based on interpolation, the problem that the edge portions of characters and the like are blurred can be solved in the following manner. An edge portion is detected first from the maximum density difference in a local region. The density of a picture element in the edge portion, which is obtained by interpolation, is replaced with the density of the nearest picture element or the maximum or minimum density in a predetermined region to remove an intermediate density, in the edge portion, produced by the interpolation, thereby preventing the edge portion of characters from blurring.

As has been described in detail above, according to the present invention, there is provided an image processing apparatus which can improve the image quality of a document image including both character and photographic images by performing expansion/reduction processing in accordance with the characteristic features of the images, or can improve the processing efficiency in various types of image processing by performing various types of processing in accordance with the characteristic features of images.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus capable of magnifying a target image at any desired magnification, comprising:
   means for detecting maximum and minimum densities from image information in a predetermined area including a target picture element of the target image;
   means for determining, from the difference between the maximum and minimum densities detected by the detection means, whether the picture element is in a photographic region or a character region;
   means for determining a picture element density appropriate for magnifying the target image, from the density of the target picture element and that of a picture element close to the target picture element;
   means for outputting the picture element density determined by the density-determining means, in accordance with whether the target picture element is in a photographic region or a character region; and
   means for comparing the picture element density determined by the density-determining means with first and second reference densities, and for selecting the maximum density when the density determined by the density-determining means is higher than the first reference density, selecting the minimum density when the density determined by the density-determining means is lower than the second reference density, and selecting an average of the maximum density and the minimum density when the density determined by the density-determining means is lower than the first reference density and higher than the second reference density,
   wherein the output means outputs the density determined by the density-determining means when the region-determining means determines that the target picture element is in the photographic region, and outputs the density selected by the density-selecting means when the region determining means determines that the target picture element is in the character region.

2. An image forming apparatus capable of magnifying a target image at any desired magnification, comprising:
   means for detecting maximum and minimum densities from image information in a predetermined area including a target picture element of the target image;
   means for determining, from the difference between the maximum and minimum densities detected by the detecting means, whether the picture element is in a photographic region or a character region;
   means for determining a picture element density appropriate for magnifying the target image, from the density of the target picture element and that of a picture element close to the target picture element;
   means for outputting the picture element density determined by the density-determining means, in accordance with whether the target picture element is in a photographic region or a character region; and
   means for comparing the picture element density determined by the density-determining means with an average of the maximum and minimum densities, and for selecting the maximum density when the density determined by the density-determining means is higher than the average of the maximum and minimum densities, and selecting the minimum density when the density determined by the density-determining means is lower than the average of the maximum and minimum densities,
   wherein the output means outputs the density determined by the density-determining means when the region-determining means determines that the target picture element is in the photographic region, and outputs the density selected by the density-selecting means when said region-determining means determines that the target picture element is in the character region.

3. An image forming apparatus capable of magnifying a target image at any desired magnification, comprising:
   means for detecting maximum and minimum densities from image information in a predetermined area including a target picture element of the target image;
   means for determining, from the difference between the maximum and minimum densities detected by the detection means, whether the picture element is in a photographic region or a character region;
   means for determining a picture element density appropriate for magnifying the target image, from the density of the target picture element and that of a picture element close to the target picture element;
   means for outputting the picture element density determined by the density-determining means, in accordance with whether the target picture element is in a photographic region or a character region; and
   means for comparing the picture element density determined by said density-determining means with an average of the maximum and minimum densities, and selecting the minimum density, when the density determined by the density-determining means is lower than the average of the maximum and minimum densities, wherein the output means outputs the density determined by the density-determining means when the region-determining means determines that the target picture element is in the photographic region, outputs the density of the target picture element when the region-determining means determines that the target picture element is in the character region and when the difference between the maximum density and the minimum density is equal to or more than a predetermined value, and outputs the density selected by said density-selecting means when the region-determining means determines that the target picture element is in the character region and when the difference between the maximum density and the minimum density is less than the predetermined value.

4. An image forming apparatus capable of magnifying a target character image to any desired magnification, comprising:

means for detecting maximum and minimum densities from image information in a predetermined area including a target picture element of the target character image;

means for determining a picture element density appropriate for magnifying the target character image, from the density of the target picture element and that of a picture element close to the target picture element;

means for comparing the picture element density determined by the density-determining means with first and second reference densities; and means for selecting the maximum density when the density determined by the density-determining means is higher than the first reference density, selecting the minimum density when the density determined by the density-determining means is lower than the second reference density, and selecting an average of the maximum density and the minimum density when the density determined by the density-determining means is lower than the first reference density and higher than the second reference density.

5. An image forming apparatus capable of magnifying a target character image to any desired magnification, comprising:

means for detecting maximum and minimum densities from image information in a predetermined area including a target picture element of the target character image;

means for determining a picture element density appropriate for magnifying the target character image, from the density of the target picture element and that of a picture element close to the target picture element;

means for comparing the picture element density determined by the density-determining means with an average of the maximum and minimum densities; and means for selecting the maximum density when the density determined by the density-determining means is higher than the average of the maximum and minimum densities, and selecting the minimum density when the density determined by the density-determining means is lower than the average of the maximum and minimum densities.

6. An apparatus according to claim 4, wherein the density-determining means further comprises means for linearly interpolating the density of the target picture element and that of the picture element close thereto.

7. An apparatus according to claim 5, wherein the density-determining means further comprises means for linearly interpolating the density of the target picture element and that of the picture element close thereto.

* * * * *